May 19, 1970 — N. P. LA PADURA — 3,512,327
DECORATIVE AND/OR STRUCTURAL MATERIAL
Filed June 20, 1968
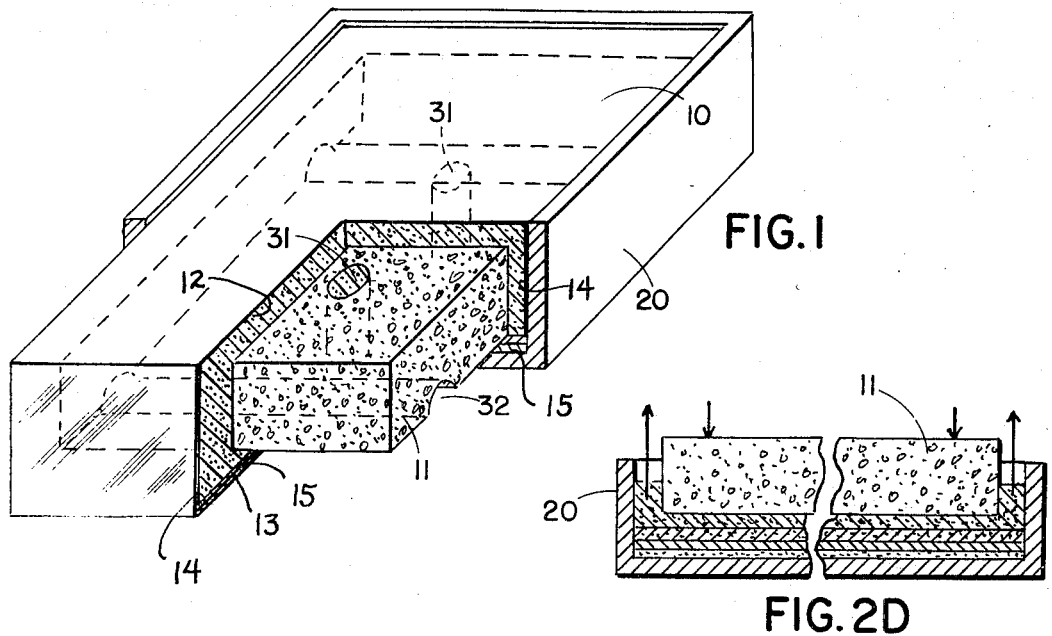
FIG. 1
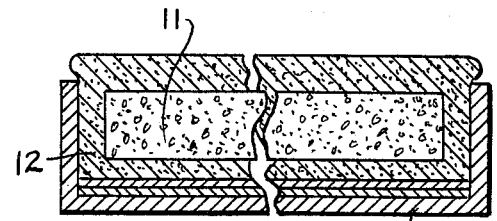
FIG. 2D
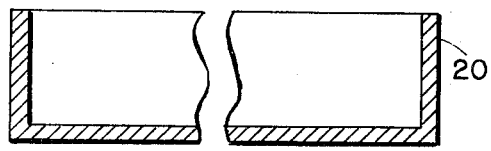
FIG. 2A
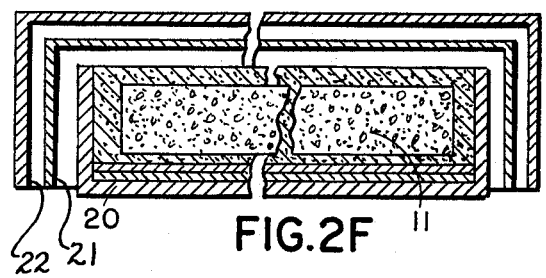
FIG. 2E
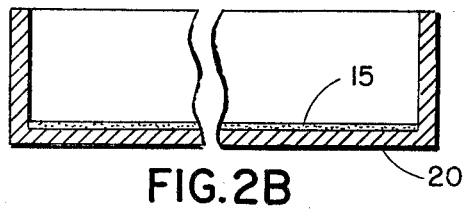
FIG. 2B
FIG. 2F
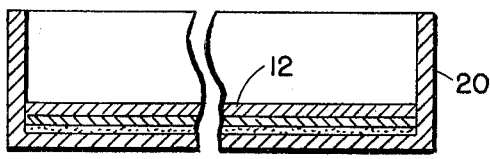
FIG. 2C
INVENTOR.
Natale P. La Padura
by Greene and Durr
ATTORNEYS.

United States Patent Office 3,512,327
Patented May 19, 1970

3,512,327
DECORATIVE AND/OR STRUCTURAL MATERIAL
Natale P. La Padura, 35 Edgar Terrace,
Staten Island, N.Y. 10301
Filed June 20, 1968, Ser. No. 738,461
Int. Cl. E04c 2/10, 2/26
U.S. Cl. 52—612      1 Claim

ABSTRACT OF THE DISCLOSURE

The invention produces a light weight brick or statuary product with the appearance of polished stone by introducing freshly mixed, soft, high alumina cement into a polished mold cavity and inserting a porous core into the mold cavity to spread the cement about the core in layers which are a minimum of about 1/8" and a maximum of about 1" in thickness with an average thickness of about 1/2".

---

This invention relates to decorative and/or structural bodies of relatively high strength and low density and to the process of making the same. Such bodies include decorative structural blocks as well as low density statuary products.

Among the objects of the invention is to provide a high strength product having the appearance of colored and polished stone and with only a fraction of the weight of a corresponding stone product.

Among the objects of the invention is to provide a structural block having a dense, glass-like surface and a relatively light, porous core.

The possibility of providing a structural body with a porous, light weight core has already been suggested. In the patent to Muhm 3,295,278, for example a load bearing structural element, is prepared by embedding a plastic foam or similar core in portland cement or gypsum. To strengthen the concrete formed from portland cement, wood fibers may be added thereto, the concrete can be prestressed by incorporating wires under tension therein, and/or unstressed wires may be incorporated in the product.

This invention is based on the discovery that a light weight body having excellent resistance to shock and compressive loads, and with an attractive glassy surface, may be formed by embedding a light weight core in a high alumina cement.

By definition, high alumina cements contain about 36–42% of alumina, 36–42% of CaO, up to 20% of iron oxides and about 4–7% of silica. Such cement also usually includes a proportion of titania. Cements of this type are usually made by melting a mixture of bauxite and limestone, cooling and grinding. The bauxites used for the manufacture of such elements are usually those high in iron, since the iron does not interfere with and possibly improves the properties desired in a cement. Because of the tolerance of high alumina cements to a relatively high iron content, waste materials, such as high alumina slags, may be employed as the source of alumina in place of a part of all of the bauxite.

In this specification, all parts listed are by weight, unless it is stated otherwise.

As is known, the high alumina cements are relatively quick setting and achieve a high proportion of their total strength fairly soon after setting. The setting times for such cements are controlled by the composition and various types of the cements are available on the market. It is also known that the "setting" is an exothermic reaction and that considerable heat develops during setting which must be controlled if blistering, burning, distortion of the mold, etc., is to be avoided.

High alumina cements are dark colored and tend to give a harsher concrete than portland cements.

For the products of the present invention, finely ground filler materials are added to the high alumina cement. Suitable materials that can be added include pumice, furnace clinker, vermiculite, perlite, fly ash, portland cement, etc. The ratio of high alumina cement: filler is between 1:0 and 1:4.

Although a characteristic feature of high alumina cement is that it produces a harsher concrete, according to the present invention, a dense glassy surface is obtained. In order to obtain such a glassy surface, a smooth surfaced mold is provided and the layer or layers of cement added are maintained thin enough by the porous core, etc. that the heat of setting is dissipated sufficiently to prevent overheating and injury to the mold surface or the cement adjacent said surface. When the core is pressed into position, all but one surface is covered with cement. Frequently, it is not necessary to cover the last surface of the product with cement, but when it is desirable, said cement is spread over the top of the core. In preparation for final setting, a damp cloth and plastic tent is applied over the exposed surface of the cement in the casting mold.

The surfaces of the molded body which have been in contact with the mold have a glassy surface substantially free of pores. Whereas it will be understood that the invention is not limited to any particular theory of operation, it is believed that the glassy surface obtained by the process is due to a phase separation of a glassy layer at the interface between the cement and the mold and to the prevention of overheating during setting. It is known, for example, that the high alumina cements include several distinct compounds or phases and that they include a glassy phase which may comprise a perovskite, $CaO \cdot TiO_2$ or a wustite-containing (FeO) glass. Other gelatinous phases have also been noted in the soft high alumina cements. In order to promote the production of the glassy surface at the interface of the mold, and to eliminate bubbles and pores from the surface layer, a vibrating step may be included.

Briefly, therefore, the process of the invention comprises providing a mold with a smooth and/or polished surface, introducing the soft, freshly plasticized high-alumina cement composition into the mold, incorporating a preformed core material of expanded plastic material into the soft cement of the mold so that it is surrounded on a plurality of its sides by relatively thin layers of the high alumina cement, and allowing the cement to set. If the article being formed is to be colored, the coloring material is introduced into the mold before the cement composition is added or it may be incorporated into the entire dry mix.

As already indicated, the mold is preferably vibrated while the cement is still soft to help bright the glassy phase to the mold-cement interface.

Any lime-free coloring composition normally used for the coloring of cements can be used. Lime containing colors are unsuitable, however. Non-acid dyes can also be added, as for example by adding to the water used to plasterize the dry mix. Suitable powdered colors are the "earth colors," such as black iron oxide, ultramarine, or cobalt blue, red oxide or iron or zinc, umber, sienna, chromium oxide, viridine green, viridine yellow, etc. Extended lists of such colors are included in "Artists Handbook of Materials and Techniques" by Ralph Mayer, published by Viking Press, New York, N.Y.

Any type of rigid, porous, plastic material may be employed as the core material, whether the porous plastic is prepared by a foaming process or with the aid of blowing agents. Suitable porous plastics include the rigid forms of expanded or foamed polyethylene, polyurethanes, polystyrene, polyvinyls, cellulose acetate, phenolics, polyepoxies, silicones, etc. Where the additional cost is justified, rigid, non-porous plastic cores may also be employed.

Preferably the layer of cement surrounding the core should be at least about 1/8" thick over all of the covered surfaces and should be no thicker than about 3/4" to 1" thick in the thickest portions, with an average thickness over the covered surfaces of about 1/2". These thicknesses provide strengths capable of passing technical requirements for many structural bodies and, at the same time, reduces the amount of heat developed during setting to an amount that can be dissipated without injuring the mold or the glassy layer of the product. For statuary, thinner and less uniformity in thickness is required. Heat developed during setting of a solid high alumina cement brick would warp or severely damage the mold surface as well as the surface of the resultant brick. The core may be provided with transverse grooves or holes for receiving the soft cement so as to form reinforcing ribs or posts in the brick and in such cases, the thickness or diameter of the reinforcing rib or posts might be slightly greater than the maximum of about 1".

For a better understanding of the invention, reference may be made to the accompanying drawing in which:

FIG. 1 is a perspective view of a structural block made according to the invention as it is being formed in the mold, and partly cut away to show the interior thereof.

FIGS. 2A to 2F are cross-sectional views illustrating steps in the preparation of a block similar to that of FIG. 1.

The block 10 of FIG. 1 comprises a core 11 of foamed plastic material surrounded by a layer of high alumina cement composition 12 and having glassy surface layers 13 and 14 on the surfaces which have been in contact with the shaping surfaces of mold 20. The color layer 15 in the final product has actually merged with the glassy layer 13. Also, the thickness of the final glassy surface layer of said product 10 is quite small, the thicknesses of layers 13 and 15 in the lower portion of FIG. 1 being exaggerated.

The core 11 can contain one or more openings 31 extending therethrough in the direction of the pressure applied to force the core into the cement and one or more transverse slots 32 to provide for reinforcements in the cement layers.

Although FIGS. 1 and 2A to 2H show a mold for forming a decorative block or block in which the top side, which is not in contact with a mold surface, is one of the larger sides, it will be realized that the top side can also be one of the smaller sides. It will also be realized that the mold cavity may take any form and may actually be mold obtained from a sculptured object by the lost wax process, for example. The mold surface is smooth and preferably polished. Where bricks or block are to be formed, molds made of plastic, stainless steel, other metals, etc., are very satisfactory. When the cement is to cover the open side of the object, the surface thereof may be trowelled or rolled. A very satisfactory material for forming a smooth interface with the cement is plastic film such as "Mylar," cellophane, etc., which can be employed to line the surfaces of molds made of plastic, plaster, wood, etc.

The following example illustrates exactly how the brick or structural block of FIG. 1 can be formed.

EXAMPLE 1

1 part of a high alumina cement is mixed with 1 part of pumice and 1 part of 80 mesh (U.S. Standard) sand and when thoroughly mixed, 1/8 part water is added. Approximately 10% by volume of carbon black as a coloring agent is introduced into the mix. The surfaces of the mold 20 are preferably smooth and polished, since the surface of the product can be no more uniform than the surface of the mold. If desired, the mold surface can be lined with a layer of plastic film. Thereafter, a thin layer of the soft, high alumina cement composition is introduced into the mold and the mold is vibrated for about 10–15 sec. on a suitable vibrating apparatus. The mold can be placed on a movable support and vibrated by hand or a mechanical vibrator can be employed. Thereafter, additional layers of the cement composition are added until sufficient cement is present in the mold to surround the core, and a core 11 of foamed polyethylene of smaller dimensions than the brick to be formed is then forced into the mold while the cement is still soft, as illustrated in FIGS. 2F and 2C. The top surface of the core is covered with the same cement composition, if it is required that all surfaces of the core be completely covered, and a damp cloth 21 and plastic sheet 22 is inserted over the top of the mold or block for curing.

After about 24 hours, the formed block is removed from the mold 20 and it is found to have a dense (nonporous), glassy surface on all areas in contact with the mold 20. The block has a black coloration, as a result of the addition of the carbon black. Without the color layer, the block would still have a highly reflective glassy surface, but would be of a light to dark gray color.

EXAMPLE 2

Instead of mixing the coloring material with the entire cement composition, a thin layer of powdered viridine green color is spread on the lower surface of the mold. A thin layer of soft, freshly mixed, high alumina cement is added and the mold is vibrated for about 5–10 sec. Thereafter, the remainder of the cement is introduced, the core is forced into position and the mold is covered with a damp cloth and plastic tent. After about 24 hours, the resultant block is removed from the mold and is found to have a glassy surface.

Instead of a brick with a single color, a multi-colored brick can be obtained by spreading several colors on the bottom of the mold. Also, a thin layer of liquid color solution can be incorporated into the bottom of the mold in place of the powdered color.

The features and principles underlying the invention described above in connection with specific exemplifications will suggest to those skilled in the art many other modifications thereof. It is accordingly desired that the appended claim shall not be limited to any specific feature or details thereof.

I claim:

1. As an article of manufacture a body having the appearance of polished stone comprising a core of foamed plastic material and an outer coating of a high alumina cement composition covering a plurality of the surfaces of said core, said alumina cement composition comprising high alumina cement and finely divided filler with the cement: filler ratio of from 1:0 to 1:4, the outer surface regions of said cement composition being dense and glassy.

References Cited

UNITED STATES PATENTS 3,106,227 10/1963 Crowley _____ 52—309
3,295,278  1/1967 Muhm _____ 52—309

FOREIGN PATENTS 236,934   1961  Australia.

JOHN E. MURTAGH, Primary Examiner

U.S. Cl. X.R.

52—309; 117—98; 161—161